United States Patent
Suzuki

(10) Patent No.: US 11,108,947 B2
(45) Date of Patent: Aug. 31, 2021

(54) FOCUS CONTROL APPARATUS, IMAGING APPARATUS, AND STORAGE MEDIUM

(71) Applicant: CANON KABUSHIKI KAISHA, Tokyo (JP)

(72) Inventor: Yasuyuki Suzuki, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/711,124

(22) Filed: Dec. 11, 2019

(65) Prior Publication Data

US 2020/0213526 A1 Jul. 2, 2020

(30) Foreign Application Priority Data

Dec. 27, 2018 (JP) .............................. JP2018-245718

(51) Int. Cl.
*H04N 5/232* (2006.01)
*G03B 13/36* (2021.01)

(52) U.S. Cl.
CPC ....... *H04N 5/232121* (2018.08); *G03B 13/36* (2013.01); *H04N 5/23218* (2018.08); *H04N 5/23245* (2013.01)

(58) Field of Classification Search
CPC ......... H04N 5/232121; H04N 5/23245; H04N 5/23218; H04N 5/232945; H04N 5/232127; H04N 5/232122; G03B 13/36
See application file for complete search history.

(56) References Cited

U.S. PATENT DOCUMENTS

| 2008/0118156 | A1* | 5/2008 | Okada | H04N 5/23218 382/195 |
| 2017/0099428 | A1* | 4/2017 | Okuyama | H04N 5/23245 |
| 2017/0343768 | A1* | 11/2017 | Shirai | H04N 5/2254 |
| 2019/0028653 | A1* | 1/2019 | Minami | G02B 7/28 |
| 2019/0191091 | A1* | 6/2019 | Kawanishi | G02B 7/36 |
| 2019/0199912 | A1* | 6/2019 | Nagano | H04N 5/23293 |
| 2020/0221034 | A1* | 7/2020 | Wada | H04N 5/232122 |

FOREIGN PATENT DOCUMENTS

JP 2012-237809 A 12/2012

* cited by examiner

*Primary Examiner* — Jason A Flohre
(74) *Attorney, Agent, or Firm* — Cowan, Liebowitz & Latman, P.C.

(57) ABSTRACT

A focus control apparatus includes a focus detection unit configured to detect a focus state, and a control unit configured to performing a focusing operation in accordance with the focus state and a setting value relating to the focusing operation. The control unit is configured to select a first state that allows user setting of the setting value and a second state that automatically sets the setting value according to the focus state. The control unit sets the setting value in a first setting range that is a range of the setting value that can be set by the user in the first state, and sets the setting value in a second setting range that is wider than the first setting range in the second state.

8 Claims, 8 Drawing Sheets

600

MANUAL MODE SELECTION

AUTOMATIC MODE SELECTION

FOCUS CONTROL APPARATUS, IMAGING APPARATUS, AND STORAGE MEDIUM

BACKGROUND OF THE INVENTION

Field of the Invention

The present invention relates to a focus control apparatus mounted on an imaging apparatus.

Description of the Related Art

An imaging apparatus, such as a digital still camera and an image camera, may be provided with a moving object imaging mode that is an imaging mode for imaging a moving object. The moving object imaging mode can provide a captured image that is well focused on the moving object through a focus control (AF) using a setting value for a focus detection suitable for the moving object. However, the moving object includes a variety of moving objects, such as one that moves monotonously to the imaging apparatus, one that that suddenly starts or stops moving, and one that moves significantly in vertical and/or horizontal directions. Thus, unless a focus detection uses a setting value corresponding to the movement of the moving object, the moving object may not be able to be well focused.

Japanese Patent Laid-Open No. ("JP") 2012-237809 discloses an imaging apparatus that extracts a feature amount of a motion of a moving object from a focus detection result and automatically changes a setting value relating to the AF based on the feature amount of the motion. In this imaging apparatus, the user can manually select a setting value.

In the imaging apparatus disclosed in JP 2012-237809, the user can manually set the setting value only within a setting value range that can be automatically changed by the imaging apparatus. Hence, for example, when the moving object moving at a constant velocity temporarily moves suddenly, even if the setting value is automatically changed within a manually settable range, the AF may not be well performed for the moving object.

SUMMARY OF THE INVENTION

The present invention provides a focus control apparatus, an imaging apparatus, and the like that can provide a good AF to a variety of objects.

A focus control apparatus according to one aspect of the present invention includes a focus detection unit configured to detect a focus state, and a control unit configured to performing a focusing operation in accordance with the focus state and a setting value relating to the focusing operation. The control unit is configured to select a first state that allows user setting of the setting value and a second state that automatically sets the setting value according to the focus state. The control unit sets the setting value in a first setting range that is a range of the setting value that can be set by the user in the first state, and sets the setting value in a second setting range that is wider than the first setting range in the second state. At least one processor or circuit is configured to perform a function of at least one of the units An imaging apparatus including the above focus control apparatus, a focus control method corresponding to the above focus control apparatus, and a storage medium storing a program that causes a computer in the focus control apparatus to execute the focus control method also constitute another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
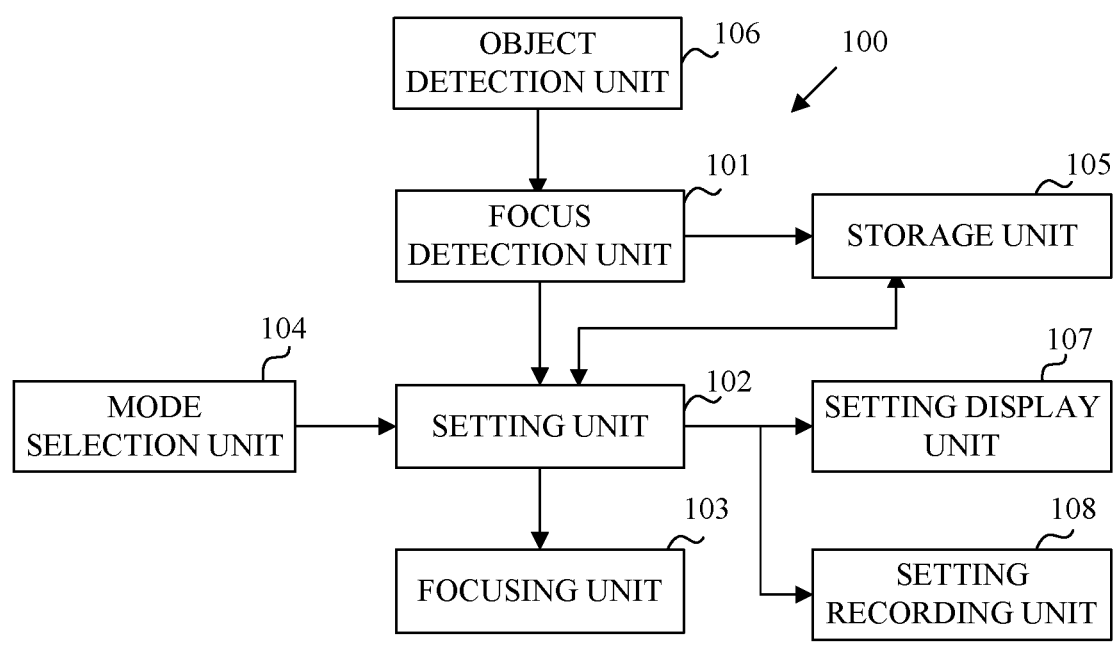
FIG. 1 is a block diagram illustrating a configuration of a focus control apparatus according to a first embodiment of the present invention.

FIG. 1 illustrates a configuration of a focus control apparatus 100 according to a first embodiment of the present invention. A focus detection unit 101 serving as a focus detection unit performs a focus detecting operation for detecting a defocus amount (focus state) in each of a plurality of focus detection areas set in the imaging screen. A defocus amount is detected (calculated) using a signal acquired from an AF sensor described later. One focus detection area (referred to as an AF area hereinafter) including an object that is a target of the focusing operation described later is selected by the user or automatically among the plurality of focus detection areas.

A setting unit 102 sets each setting value of a plurality of setting items (referred to as tracking setting items hereinafter) relating to tracking AF that performs a focusing operation following a moving object as the setting item relating to the focusing operation.

The plurality of tracking setting items include, for example, setting items 1 and 2. The setting item 1 relates to an object tracking characteristic, and a setting value for adjusting a supplemental characteristic when the object shifts from the AF area during the tracking AF can be set. As the setting value increases from 0 (standard value) to the plus side (+1, +2), it becomes easier to focus on an object newly captured by the AF area. The larger the value is on the minus side (−1, −2), the easier it is to keep focusing on the object even if the object becomes out of the AF area.

The setting item 2 relates to a tracking characteristic relative to the velocity change of the moving object, and a setting value for adjusting the operation of the tracking AF relative to the velocity change, such as an acceleration, a deceleration, and a stop of the moving object, can be set. The setting value 0 is suitable to follow a moving object that does not suddenly accelerate or decelerate. +1 and +2 are suitable to follow a moving body that suddenly starts moving, suddenly accelerates or decelerates, and suddenly stops, and +2 is suitable to follow a velocity change larger than +1.

Setting items other than the setting items 1 and 2 described above may be provided as tracking setting items. For example, a setting item relating to the AF area change characteristic for automatically changing the AF area in a plurality of focus detection areas may be provided. The setting value 0 is a standard setting value that gently changes the AF area, +1 and +2 are setting values that change the AF area in response to a slight focus change, and +2 enables the AF area to be more easily changed than +1. While this embodiment describes the tracking setting item is described as an illustrative setting item relating to the focusing operation, setting items other than the tracking setting item may be provided.

A focusing unit 103 performs a focusing operation that moves a focus lens described later to a position where the moving object is focused, on the basis of the setting value set by the setting unit 102. The AF as the focus control is performed by the focus detection operation and the focusing operation.

A mode selection unit 104 can select a setting mode used to set a setting value of each tracking setting item between a manual mode (first state) that allows a user to manually set a setting value as a fixed value (predetermined value), and an automatic mode (second state) that causes the setting unit 102 to automatically set the setting value according to the detected defocus amount. The mode selection unit 104 selects the automatic or manual mode by operating a mode setting button provided on an operation unit 222 described later. The setting unit 102 and the mode selection unit 104 constitute a control unit.

When the mode selection unit 104 selects the manual mode, the setting unit 102 can set the setting value corresponding to the manual mode as the setting value of the tracking setting item. On the other hand, when the mode selection unit 104 selects the automatic mode, the setting unit 102 automatically sets the setting value of the tracking setting item. In the automatic mode, the setting value can be set in a wider range (second setting range) than the setting value range (first setting range: hereinafter referred to as a manual setting range hereinafter) that can be manually set by the user in the manual mode.

A storage unit (memory) 105 stores an image plane position calculated from the defocus amount detected in the past multiple times by the focus detection unit 101 and the detection time of the defocus amount correlated with each other. An object detection unit 106 detects a coordinate position of the object in an imaging screen according to luminance information in the imaging screen. A setting display unit 107 displays the setting value of the tracking setting item set by the setting unit 102 on a viewfinder screen and an external monitor screen provided in the camera described later. A setting recording unit 108 records the setting value of the tracking setting item set by the setting unit 102 as additional information of the captured image (part of the captured image data).

Figure 2:
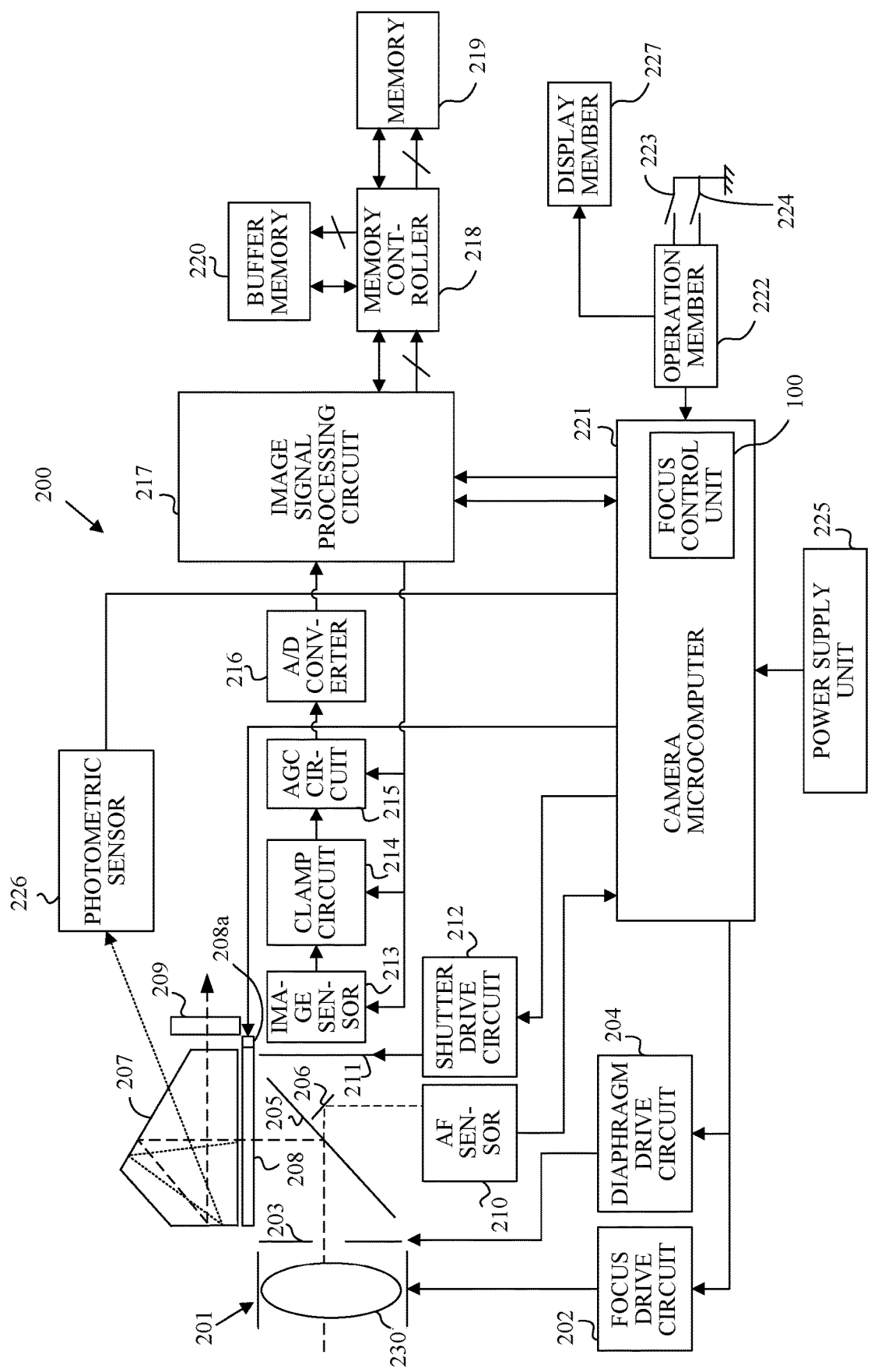
FIG. 2 is a block diagram illustrating a configuration of a single-lens reflex digital camera including the focus control apparatus according to the first embodiment.

FIG. 2 illustrates a configuration of a lens-interchangeable single-lens reflex digital camera (referred to as a camera body hereinafter) 200 as an imaging apparatus provided with the focus control apparatus 100. An interchangeable lens 201 is detachably attached to the camera body 200. An imaging lens 230 as an imaging optical system is housed in the interchangeable lens 201. The imaging apparatus may be a lens-integrated camera in which the imaging lens is integrated with the camera body.

The camera body 200 includes a camera microcomputer 221, and the camera microcomputer 221 includes the above focus control apparatus (referred to as a focus control unit hereinafter) 100.

A focus drive circuit 202 includes a focus actuator such as a DC motor and a vibration motor, and moves the focus lens in the imaging lens 230 in the optical axis direction in accordance with an instruction from a camera microcomputer 221 described later for focusing. The focus drive circuit 202 may perform focusing by moving an image sensor 213 described later in the optical axis direction. A diaphragm drive circuit 204 drives a diaphragm (aperture stop) 203 by an diaphragm drive amount calculated by the camera microcomputer 221 so as to change the optical aperture value (F-number).

A main mirror 205 is disposed in the imaging optical path in the viewfinder observation state, and reflects part of the light beam incident from the imaging lens 230 toward the optical viewfinder. The optical viewfinder includes a focus plate 208, a pentaprism 207, and an eyepiece lens 209, and the light beam reflected by the main mirror 205 forms an object image on the focus plate 208. The user can observe the object image on the focus plate 208 via the eyepiece lens 209 and the pentaprism 207. The focus plate 208 is provided with a viewfinder display unit (display unit) 208a for displaying a variety of setting values relating to imaging on the viewfinder screen.

The light beam reflected on the main mirror 205 is guided through the pentaprism 207 to a photometric sensor 226, which then detects the luminance of the object image.

The central portion of the main mirror 205 has a half-mirror, and the light beam transmitted through it is reflected by a sub-mirror 206 disposed behind the main mirror 205 and enters an AF sensor 210. The AF sensor 210 is provided with a line sensor (photoelectric conversion element group) paired with a secondary imaging lens for performing a focus detection by a phase difference detection method. The secondary imaging lens divides the light beam from the sub-mirror 206 into two so as to form a pair of optical images (object images). The pair of line sensors photoelectrically convert the pair of object images to generate a pair of phase difference image signals and output them to the camera microcomputer 221. The camera microcomputer 221 calculates a phase difference between the pair of phase difference image signals by a correlation calculation, and further calculates a defocus amount from the phase difference. Then, the camera microcomputer 221 calculates a focus lens drive amount for obtaining a focus state from the calculated defocus amount, and performs a focus control so as to drive the focus lens by the drive amount.

In this embodiment, the photometric sensor 226 and the AF sensor 210 are independent of each other, but a plurality of pixels of the image sensor 213 may be used as the photometric sensor and the AF sensor.

In the imaging state, the main mirror 205 retreats out of the imaging optical path so that the light beam from the imaging lens 230 reaches the image sensor 213. A shutter drive circuit 212 drives a focal plane shutter 211 in accordance with an instruction from the camera microcomputer 221. The image sensor 213 includes a CCD sensor, a CMOS sensor, or the like, and generates and outputs an analog imaging signal by photoelectrically converting (imaging) the object image formed by the imaging lens 230. Each of a clamp circuit 214 and an AGC circuit 215 changes the clamp level and the AGC reference level of the analog imaging signal in accordance with an instruction from the camera microcomputer 221. An A/D converter 216 converts the analog imaging signal output from the AGC circuit 215 into a digital imaging signal.

An image signal processing circuit 217 performs variety image processing such as filter processing, color conversion processing, and gamma processing on the digital imaging signal to generate image data. In addition, the image signal processing circuit 217 performs compression processing such as JPEG for the image data, and outputs the compressed image data to a memory controller 218. The memory controller 218 controls the storages and retrievals of data in a memory 219 and a buffer memory 220. The image signal processing circuit 217 outputs information such as an exposure of the image sensor 213 and a white balance to the camera microcomputer 221 as necessary. The camera microcomputer 221 instructs the image signal processing circuit 217 to make an adjustment such as a gain and a white balance, based on the information.

In continuous still image capturing, the image signal processing circuit 217 stores unprocessed digital imaging signals (image data) in the buffer memory 220, and performs image processing and compression processing for unprocessed image data read through the memory controller 218. The number of continuous still images is determined according to the size of the buffer memory 220.

The memory controller 218 stores the unprocessed image data input from the image signal processing circuit 217 in the buffer memory 220 and stores the processed image data in the memory 219. The memory controller 218 reads the image data from the buffer memory 220 and the memory 219 and outputs it to the image signal processing circuit 217. The memory 219 may be detachable.

The operation unit 222 includes a variety of operation members, such as a button, a lever, and a dial, operable by the user. The operation state of the operation unit 222 is transmitted to the camera microcomputer 221. The camera microcomputer 221 controls each unit according to the state of the operation unit 222.

A switch (SW1) 223 and a switch (SW2) 224 are turned on by half-pressing operation and full-pressing operation of a release button included in operation unit 222, respectively. The camera microcomputer 221 starts an imaging preparation operation, such as the AF and AE (photometry and exposure control), when the switch (SW1) 223 turns on, and performs an imaging operation when the switch (SW2) 224 turns on. The camera microcomputer 221 performs a still image capturing operation continuously while turning on of the switch (SW1) 223 and the switch (SW2) 224 continue.

A power supply unit 225 supplies the power necessary for the camera microcomputer 221 and other circuits. An external display unit (display unit) 227 includes a display device such as a liquid crystal monitor, and displays a live-view image and a captured image as a finder image, and displays various information relating to imaging.

As described above, in the camera body 200 according to this embodiment, the user can select the automatic mode and the manual mode as the setting mode for the setting values of the plurality of tracking setting items. When the manual mode is selected, the camera microcomputer 221 allows the user to set the setting value within the manual setting range.

Figure 6:
FIG. 6 illustrates a selection screen of a manual mode and an automatic mode according to the first embodiment.
Figure 6:
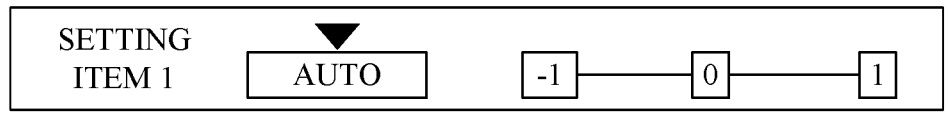

Referring to FIG. 6, a description will be given of a display example of the tracking setting item on the viewfinder screen when the manual mode and the automatic mode are selected. The camera microcomputer 221 displays the setting value of the tracking setting item on the viewfinder display unit 208a described above. Alternatively, the setting value of the tracking setting item may be displayed on the external display unit 227. FIG. 6 illustrates a display example of setting item 1.

In the setting item 1, −1, 0, +1 as the setting value that can be set in the manual mode and "AUTO" as a setting value that is automatically set in the automatic mode are selectively displayed. Although not illustrated in FIG. 6, for the setting item 2, 0, +1, +2 as the setting values are selectively displayed that can be set in the manual mode, and "AUTO" as the setting value that is automatically set in the automatic mode. The setting value and its range (manual setting range) in the manual mode are merely illustrative, and other setting values and ranges may be used.

In setting item 1, in the manual mode, a mark "▼" is displayed on the setting value manually set by the user among −1, 0, and +1. In the automatic mode, "▼" is displayed above "AUTO". As described above, in the automatic mode, the camera microcomputer 221 can set a setting value exceeding the range (at least one of the upper limit value +1 and the lower limit value −1), such as −2 and +2, in addition to the setting value (−1, 0, +1) that can be set in the manual mode.

In the automatic mode, the camera microcomputer 221 automatically sets the tracking setting item. In other words, the camera microcomputer 221 automatically selects the tracking setting item in accordance with the motion of the moving object that changes every moment (for example, even when the moving object that has moved at a constant velocity temporarily moves suddenly), and enables the AF to follow the motion of the object.

Referring now to a flowchart in FIG. 3, a description will be given of an imaging operation including a focusing operation according to this embodiment. The camera microcomputer 221 executes this processing in accordance with the computer program.

When the user turns on the SW1, the camera microcomputer 221 causes the focus detection apparatus 100 to start a focusing operation. First, in the step S301, the object detection unit 106 detects the coordinate position of the object in the imaging screen based on the luminance information obtained through the photometric sensor 226. In other words, it detects the object.

Figure 4:
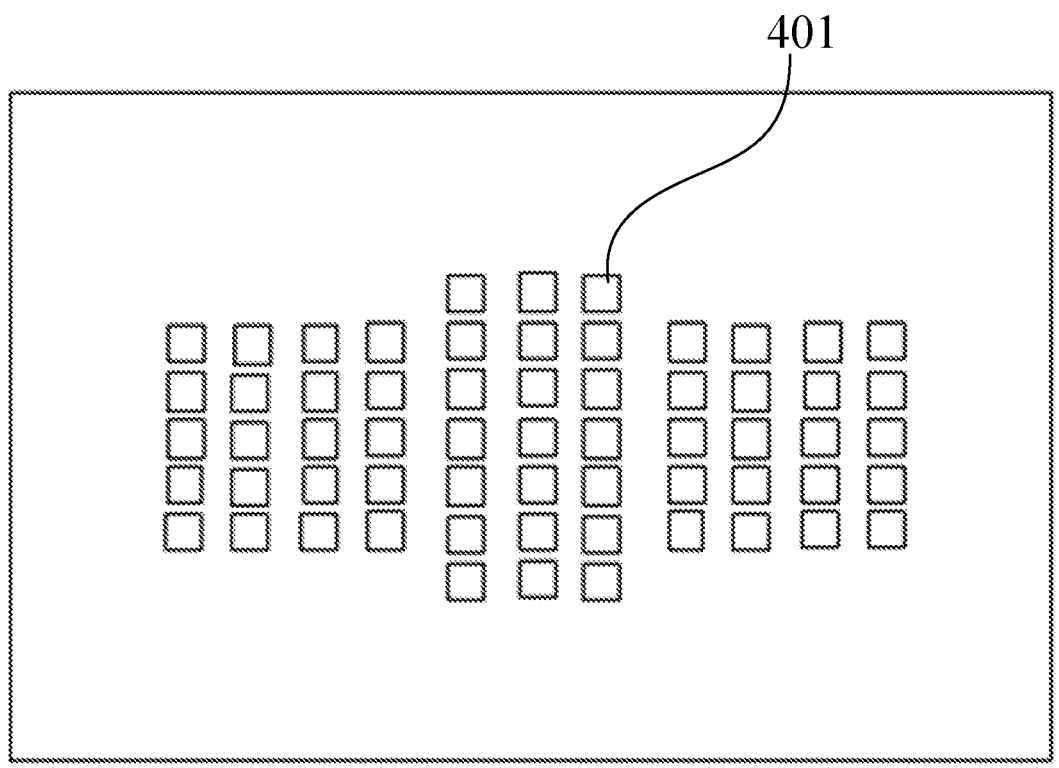
FIG. 4 illustrates a focus detection area according to the first embodiment.

Next, in the step S302, the focus detection unit 101 detects a defocus amount from the phase difference obtained using the AF sensor 210. FIG. 4 illustrates an example of a plurality of focus detection areas 401 in which the focus detection unit 101 can detect the defocus amount. The defocus amount is calculated (detected) from the phase difference between the pair of phase difference image signals obtained by the pair of line sensors arranged in the focus detection area 401 indicated by a square in FIG. 4. The defocus amount detected in each focus detection area is temporarily stored in the memory 219 correlated with the detection time.

Next, in the step S303, the camera microcomputer 221 determines whether or not the setting mode of the setting value of the tracking setting item is the automatic mode. The camera microcomputer 221 proceeds to the step S304 when the automatic mode is selected, and proceeds to the step S305 when the automatic mode is not selected (or when the manual mode is set).

In the step S304, the camera microcomputer 221 automatically determines the setting value of the tracking setting item. The setting unit 102 sets the setting value determined by the camera microcomputer 221 for the focusing unit 103. Details of the processing in the step S304 will be described later. Thereafter, the camera microcomputer 221 proceeds to the step S306.

On the other hand, in the step S305, the camera microcomputer 221 determines the setting value of the tracking setting item in accordance with a user instruction (user setting) within the predetermined manual setting range. The setting unit 102 sets the setting value determined by the camera microcomputer 221 for the focusing unit 103. Thereafter, the camera microcomputer 221 proceeds to the step S306.

In the step S306, the focusing unit 103 selects one or more AF areas from among a plurality of focus detection areas according to the defocus amount detected by the focus detection unit 101 and the setting value of the tracking setting item set by the setting unit 102.

Next, in the step S307, the focusing unit 103 causes the storage unit 110 to store the image plane position calculated from each of the defocus amounts detected in the AF area by the focus detection unit 101 in the past multiple times, correlated with the detection time.

In the step S308, the focusing unit 103 provides focusing using the image plane position and the detection time of the defocus amount in the past multiple times stored in the storage unit 105, and the setting value of the tracking setting item set by the setting unit 102.

Next, in the step S309, the camera microcomputer 221 determines whether or not the SW2 is turned on. The camera microcomputer 221 proceeds to the step S310 when the SW2 is turned on, and proceeds to the step S313 when SW2 is not turned on.

In the step S310, the camera microcomputer 221 captures an image for recording. In the step S311, the setting display unit 107 displays the setting value of the tracking setting item set by the setting unit 102 on the viewfinder screen. Details of the processing in the step S311 will be described later.

Next, in the step S312, the setting recording unit 108 records the setting value of the tracking setting item set by the setting unit 102 as additional information of the captured image. Details of the processing in the step S312 will be described later.

In the step S313, the camera microcomputer 221 determines whether or not the SW1 is turned on. The camera microcomputer 221 returns to the step S301 when SW1 is turned on, and ends the imaging operation when the SW1 is not turned on.

Figure 3:
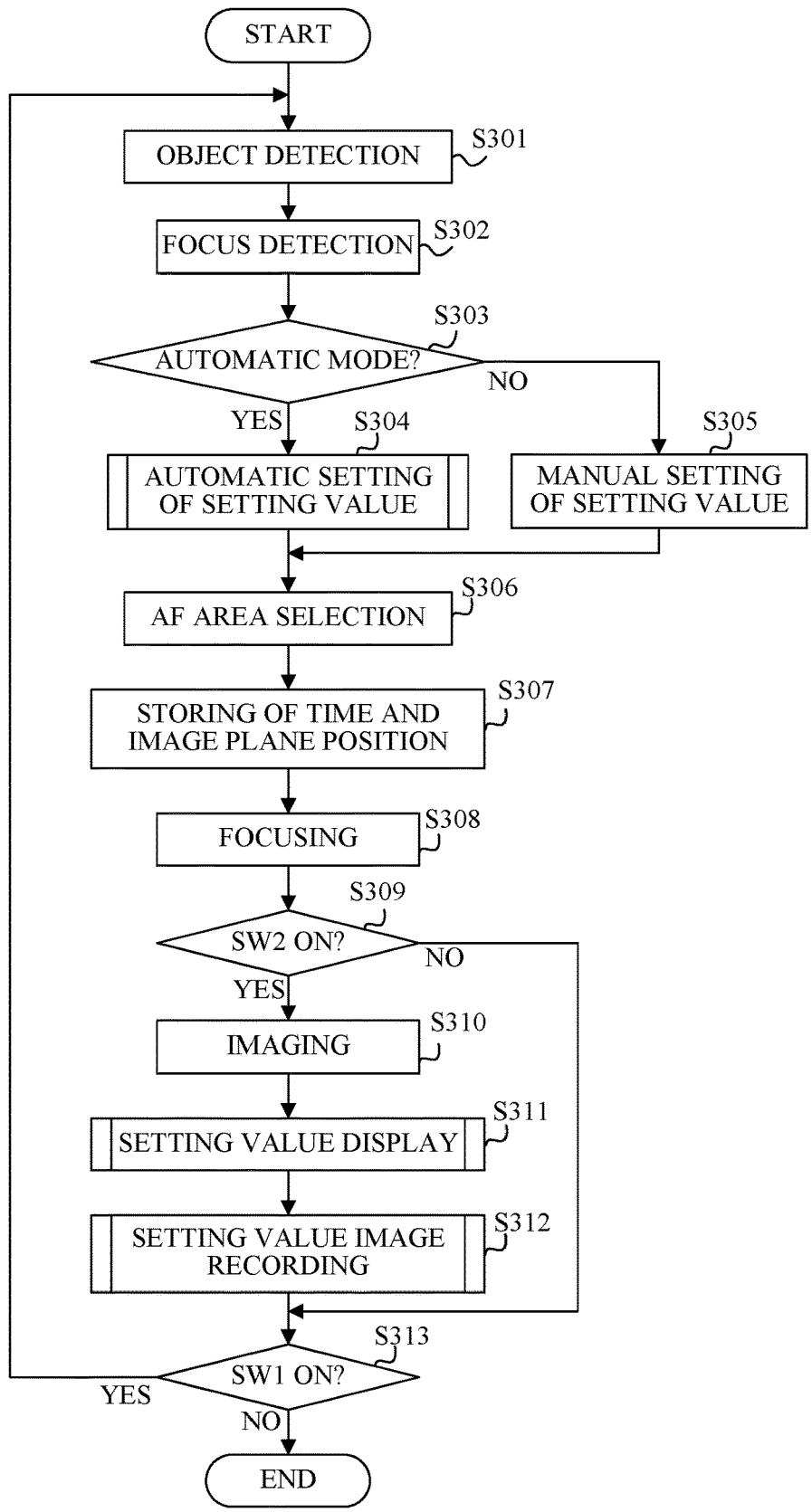
FIG. 3 is a flowchart showing an AF operation according to the first embodiment.
Figure 5:
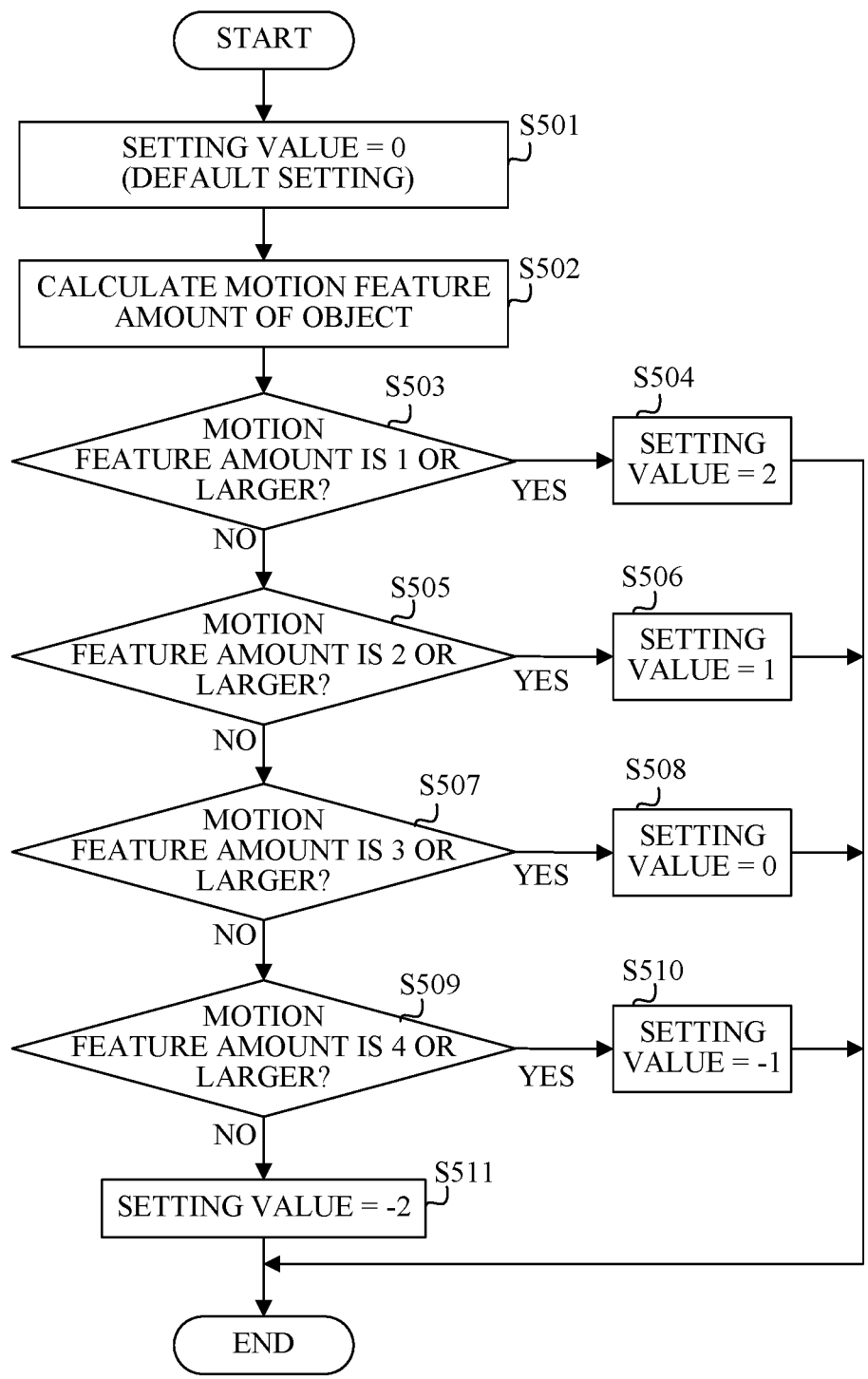
FIG. 5 is a flowchart illustrating automatic setting processing according to the first embodiment.

FIG. 5 illustrates processing in which the camera microcomputer 221 automatically determines the setting value of the tracking setting item in the step S304 of FIG. 3. A description will be given of the automatic determination processing of the setting value for the setting item 1. For the setting item 2, the setting value is automatically determined in the same manner except for the different manual setting range.

First, in the step S501, the camera microcomputer 221 sets the setting value of the tracking setting item to 0 (default setting value). Next, in the step S502, the camera microcomputer 221 calculates the feature amount of the moving object (referred to as a motion feature amount hereinafter) using the image plane position, the image plane velocity, and the image plane acceleration obtained using the default setting value set in the step S501, the object detection result in the step S301, and the focus detection result in the step S302 in FIG. 3, the focal length of the imaging lens 230, the object distance, the moving velocity of the moving object, the tracking information, and the motion vector indicating the moving amount and the moving direction of the moving object, etc.

The tracking information is information used for the object tracking processing obtained as a result of the object detection from the luminance information obtained through the photometric sensor 226. The tracking processing is processing for specifying the same object in different frame images based on the characteristics of the object. Specific examples of the tracking information include the size of the object, the coordinate where the object is located, the focus detection area corresponding to the object position, the color of the object, the reliability of the tracking processing, and the like. Although not described herein, a general method may be used as a method for calculating the motion feature amount of the moving object.

Next, in the step S503, the camera microcomputer 221 determines whether or not the motion feature amount calculated in the step S502 is equal to or greater than a threshold value 1 as a first predetermined value. This threshold value 1 is a threshold value for determining whether or not the setting value +2 exceeding the upper limit value +1 of the manual setting range (−1 to +1) is set as the setting value in the automatic mode. If the motion feature amount is equal to or greater than the threshold value 1, the camera microcomputer 221 proceeds to the step S504 and sets the setting value to 2. Then, this process ends. On the other hand, if the motion feature amount is smaller than the threshold value 1, the camera microcomputer 221 proceeds to the step S505.

In the step S505, the camera microcomputer 221 determines whether or not the motion feature amount calculated in the step S502 is equal to or greater than a threshold value 2 as a second predetermined value. This threshold value 2 is a threshold value for determining whether or not the upper limit value +1 of the manual setting range (−1 to +1) is set as the setting value in the automatic mode. If the motion feature amount is equal to or greater than the threshold value 2, the camera microcomputer 221 proceeds to the step S506 and sets the setting value to 1. Then, this process ends. On the other hand, if the motion feature amount is smaller than the threshold value 2, the camera microcomputer 221 proceeds to the step S507.

In the step S507, the camera microcomputer 221 determines whether or not the motion feature amount calculated in the step S502 is equal to or greater than a threshold value 3. The threshold value 3 is a threshold value for determining whether or not 0 is set as the setting value in the manual setting range (−1 to +1) in the automatic mode. If the motion feature amount is equal to or greater than the threshold 3, the camera microcomputer 221 proceeds to the step S508 and sets the setting value to 0. Then, this process ends. On the other hand, if the motion feature amount is smaller than the threshold 3, the camera microcomputer 221 proceeds to the step S509.

In the step S509, the camera microcomputer 221 determines whether or not the motion feature amount calculated in the step S502 is equal to or greater than a threshold value 4. This threshold value 4 is a threshold value for determining whether or not the lower limit value −1 is set in the manual setting range (−1 to +1) as the setting value in the automatic mode. If the motion feature amount is equal to or greater than the threshold value 4, the camera microcomputer 221 proceeds to the step S510 and sets the setting value to −1.

Then, this process ends. On the other hand, if the motion feature amount is smaller than the threshold value 4, the camera microcomputer 221 proceeds to the step S511.

In the step S511, the camera microcomputer 221 sets a setting value −2 that exceeds as the setting value the lower limit value −1 of the manual setting range (−1 to +1) to the minus side.

Figure 7:
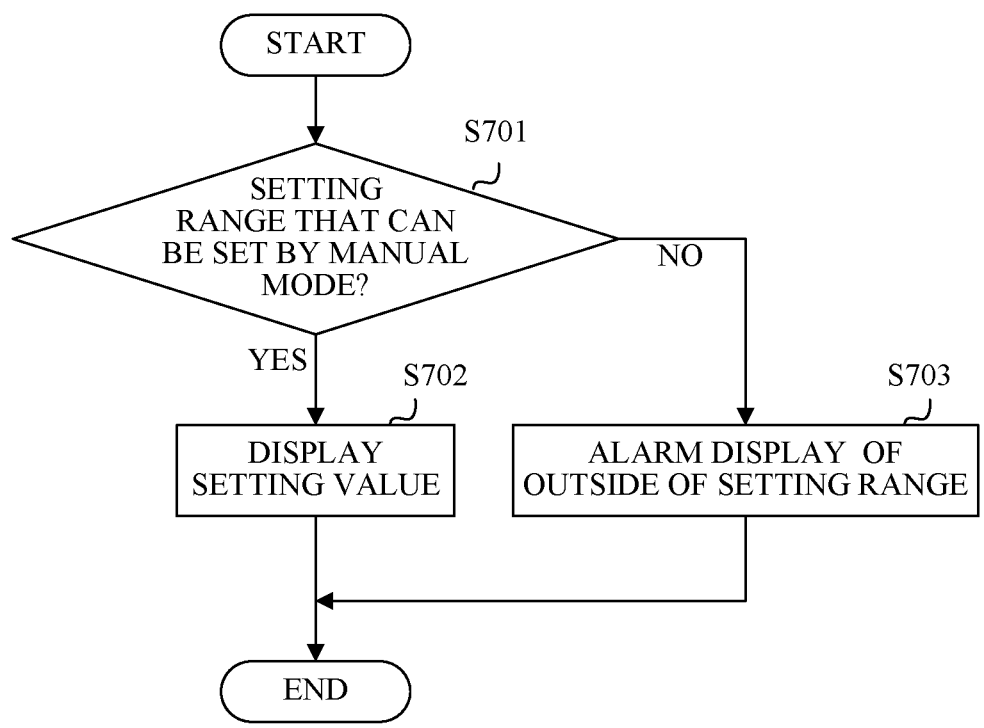
FIG. 7 is a flowchart illustrating setting value display processing according to the first embodiment.

FIG. 7 illustrates processing in which the setting display unit 107 displays the setting value of the tracking setting item on the viewfinder screen in the step S311 in FIG. 3.

First, in the step 701, the setting display unit 107 determines whether or not the setting value set in the steps S304 and S305 is within the manual setting range. If the setting value is within the manual setting range, the setting display unit 107 proceeds to the step S702 and displays the setting value on the viewfinder screen. Then, this process ends.

On the other hand, if the setting value is outside the manual setting range, the setting display unit 107 proceeds to the step S703 and displays on the viewfinder screen notifying that the setting value exceeds the manual setting range. Then, this process ends. An example of setting value display on the viewfinder screen will be described later.

Figure 8:
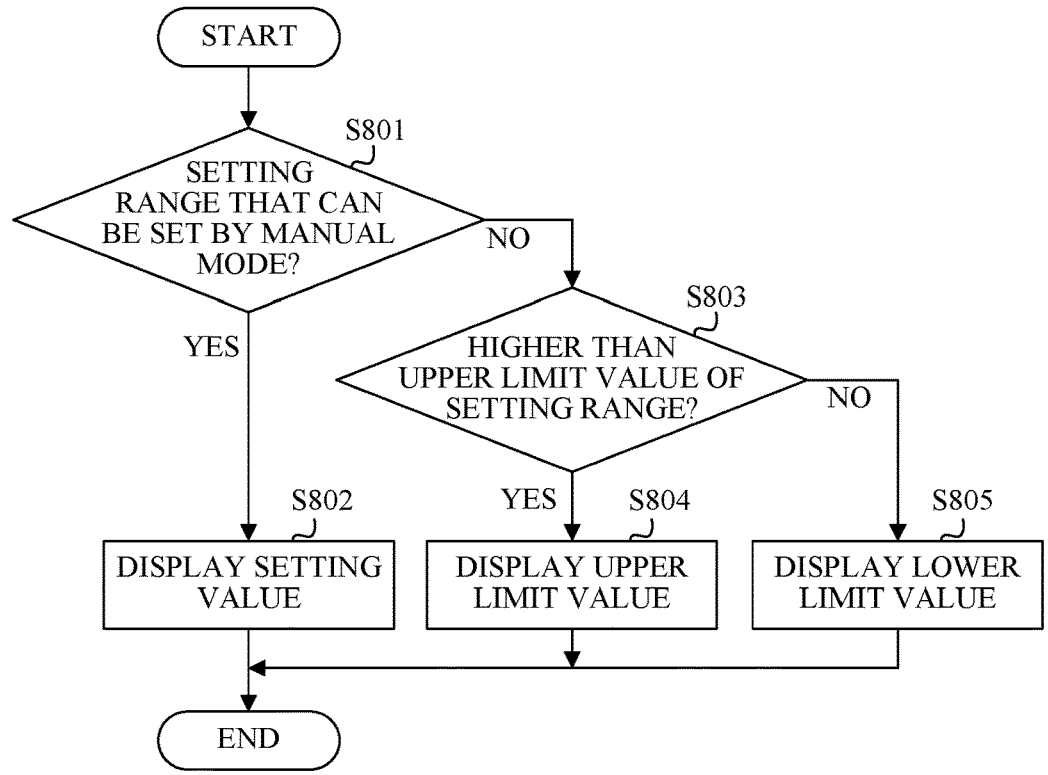
FIG. 8 is a flowchart illustrating a variation of the setting value display processing according to the first embodiment.

FIG. 8 illustrates a modification of the processing illustrated in FIG. 7. The steps S801 and S802 are the same as the steps S701 and S702.

The setting display unit 107 that has determined that the setting value is outside the manual setting range in the step S801 proceeds to the step S803.

In the step S803, the setting display unit 107 determines whether or not the setting value set in the steps S304 and S305 is greater than the upper limit value of the manual setting range. If it is determined that the setting value is greater than the upper limit value of the manual setting range, the setting display unit 107 proceeds to the step S804 and displays the upper limit value on the viewfinder screen. Then, this process ends. On the other hand, if it is determined that the setting value is smaller than the upper limit value of the manual setting range, the setting display unit 107 proceeds to the step S805 and displays the lower limit value of the manual setting range on the viewfinder screen. Then, this process ends.

The setting value set in the automatic mode in the steps S803 and S804 is rounded and displayed within the manual setting range because the user may be confused if the displayed setting value is different from the setting value that can be set in the manual mode. Therefore, in this modification, the setting value set in the automatic mode is displayed on the viewfinder screen within the manual setting range.

Figure 9:
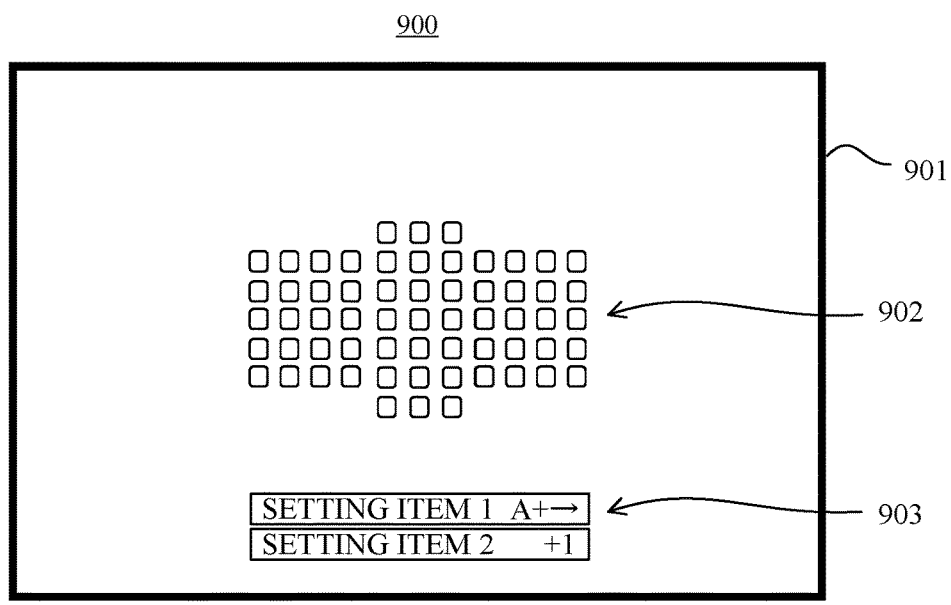
FIG. 9 illustrates illustrative setting value display according to the first embodiment.

FIG. 9 illustrates a display example of the setting value on the viewfinder screen. In FIG. 9, a thick frame 901 indicates an outer edge of the viewfinder screen. A plurality of squares 902 indicate focus detection areas, and correspond to the plurality of focus detection areas 401 illustrated in FIG. 4. The setting value display 903 numerically displays the setting values of the setting items 1 and 2 set by the setting unit 102. There may be one or more setting items.

In the setting item 1, in the automatic mode, a display for alarming that the setting value has exceeded the manual setting range is made similar to the step S703 in FIG. 7. In order to notify the automatic mode, the combination of the capital "A" in AUTO and "+→" indicating that the setting value has exceeded the upper limit of the manual setting range are displayed. This configuration notifies that the setting value has exceeded the manual setting range in the automatic mode.

In addition, the fact that the setting value in the automatic mode has exceeded the manual setting range may be alarmed only by the capital "A" of AUTO, or only "+→" indicating that the setting value has exceeded the upper limit value of the manual setting range, or any notation method may be used. It is not always necessary to display the setting value and the setting mode in the viewfinder screen as illustrated in FIG. 9.

Figure 10:
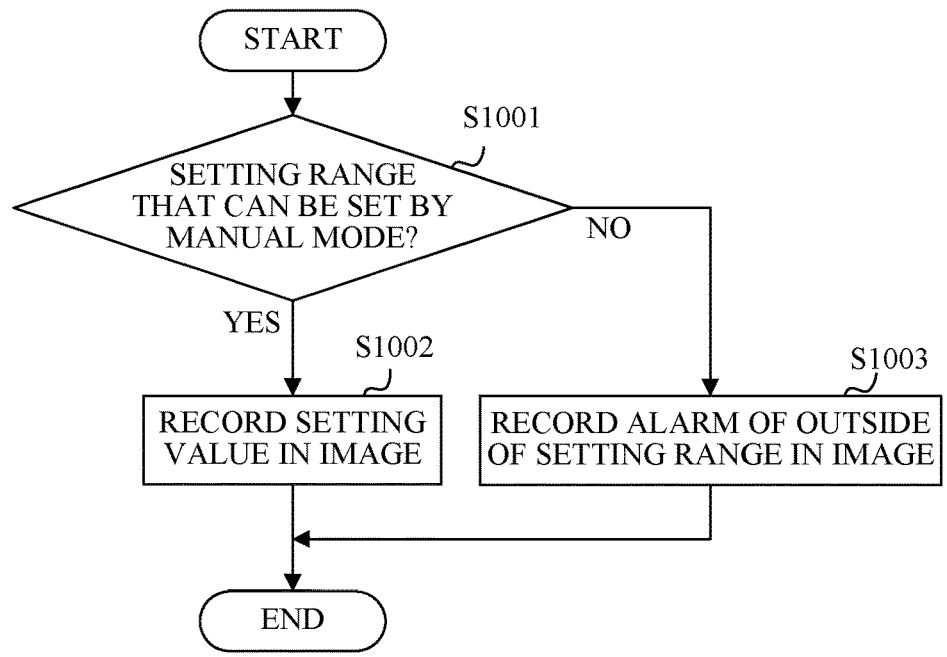
FIG. 10 is a flowchart illustrating setting value recording processing according to the first embodiment.

FIG. 10 illustrates processing in which the setting recording unit 108 records as additional information of the captured image the setting value of the tracking setting item set by the setting unit 102 in the step S312 in FIG. 3.

In the step S1001, the setting recording unit 108 determines whether or not the setting value set in the steps S304 and S305 is within the manual setting range. If the setting value is within the manual setting range, the setting recording unit 108 proceeds to the step S1002 and records the setting value as additional information of the captured image. Then, this process ends. On the other hand, if the setting value is outside the manual setting range, the setting recording unit 108 proceeds to the step S1003 and records as additional information of the captured image information notifying that the setting value has exceeded the manual setting range. Then, this process ends.

The additional information for notifying that the setting value has exceeded the manual setting range may be information combining "A" and "+→" with each other as in the setting value display 903 illustrated in FIG. 9. Alternatively, it may be information of only "A" or "+→", and may be information in any format.

Figure 11:
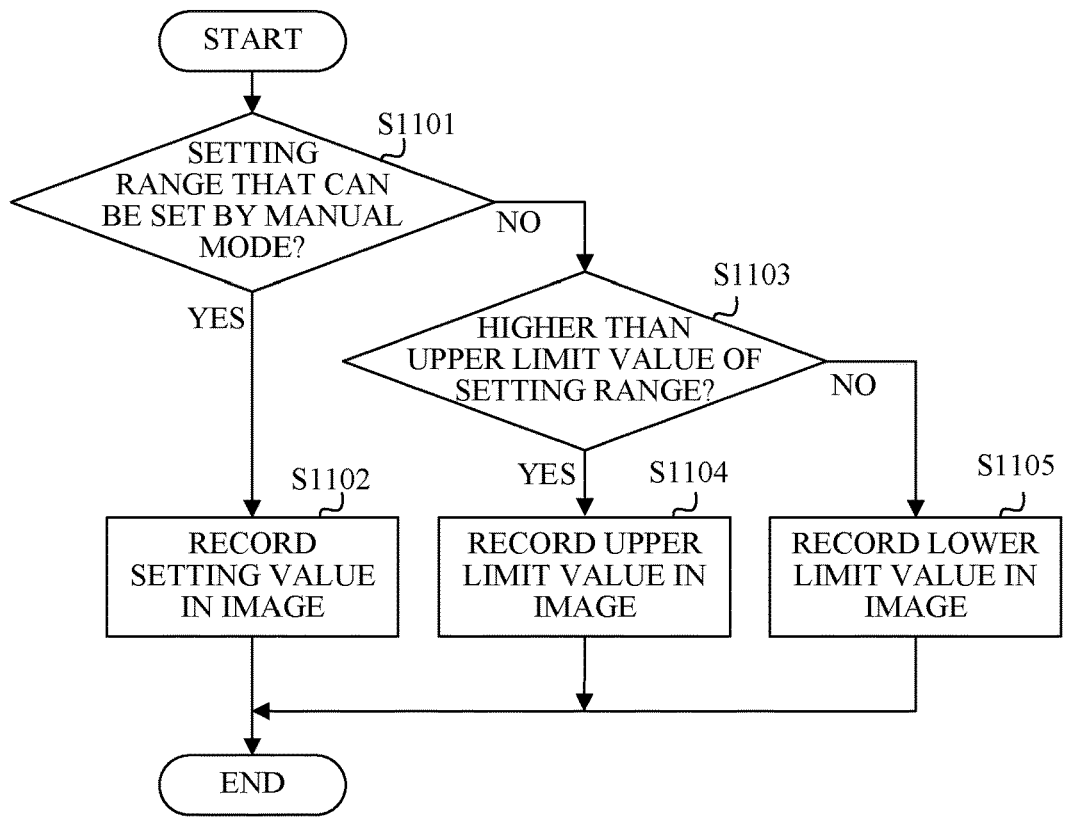
FIG. 11 is a flowchart illustrating a variation of the setting value recording processing according to the first embodiment.

FIG. 11 illustrates a modification of the processing illustrated in FIG. 10. The steps S1101 and S1102 are the same as the steps S1001 and S1002.

In the step S1101, the setting recording unit 108 proceeds to step S1103 when determining that the setting value set in the steps S304 and S305 is outside the manual setting range.

In the step S1103, the setting recording unit 108 determines whether or not the setting value set in the steps S304 and S305 is greater than the upper limit value of the manual setting range. If the setting value is larger than the upper limit value of the manual setting range, the setting recording unit 108 proceeds to the step S1104 and records the upper limit value as additional information of the captured image. Then, this process ends. On the other hand, if the setting value is smaller than the upper limit value of the manual setting range, the setting recording unit 108 proceeds to the step S1105 and records the lower limit value of the manual setting range as additional information of the captured image. Then, this process ends.

The setting value set in the automatic mode in the steps S1103 and S1104 is rounded and displayed within the manual setting range because the user may be confused when the setting value recorded as the additional information of the captured image is different from the setting value that can be manually set. Therefore, this modification records as additional information of the captured image the setting value set in the automatic mode within the manual setting range.

The embodiment described above can provide a good tracking AF on a variety of moving bodies by enabling the automatic setting even if the setting value is located outside the setting range that can be set by the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-245718, filed on Dec. 27, 2018, which is hereby incorporated by reference herein in its entirety.

What is claimed is:

1. A focus control apparatus comprising:
at least one memory configured to store instructions; and
at least one processor communicatively connected to the at least one memory and configured to execute the stored instructions to function as:
a focus detection unit configured to detect a focus state; and
a control unit configured to perform a focusing operation in accordance with the focus state and a setting value of a characteristic of the focusing operation relative to a motion of an object,
wherein the control unit is configured to select a first state that allows user setting of the setting value and a second state that automatically sets the setting value according to the focus state, and
wherein the control unit sets the setting value in a first setting range that is a range of the setting value that can be set by the user in the first state, and sets the setting value in a second setting range that is wider than the first setting range in the second state.

2. The focus control apparatus according to claim 1, wherein the second setting range is a range that exceeds at least one of an upper limit value and a lower limit value of the first setting range.

3. The focus control apparatus according to claim 1, wherein the control unit causes a display unit to display or a recording unit to record that the setting value outside the first setting range is set when the setting value set in the second state is outside the first setting range.

4. The focus control apparatus according to claim 1, wherein the control unit causes a display unit to display or a recording unit to record an upper limit value or a lower limit value of the first setting range when the setting value set in the second state is outside the first setting range.

5. The focus control apparatus according to claim 1, wherein the setting value of the characteristic of the focusing operation relative to the motion of the object corresponds to, in a case where an object which is a target of the focusing operation becomes out of an AF area, ease of switching the target of the focusing operation to another object.

6. The focus control apparatus according to claim 1, wherein the setting value of the characteristic of the focusing operation relative to the motion of the object corresponds to ease of following the object which is a target of the focusing operation relative to a sudden motion change of the object.

7. A focus control method configured to perform a focusing operation in accordance with a detected focus state and a setting value of a characteristic of the focusing operation relative to a motion of an object, the focus control method comprising the steps of:
selecting a first state that allows user setting of the setting value and a second state that automatically sets the setting value according to the focus state; and
setting the setting value in a first setting range that is a range of the setting value that can be set by the user in the first state, and sets the setting value in a second setting range that is wider than the first setting range in the second state.

8. A non-transitory computer-readable storage medium storing a computer program for causing a computer of a focus control apparatus that performs a focusing operation according to the detected focus state and a setting value of a characteristic of the focusing operation relative to a motion of an object to execute a control method,
wherein the control method includes the steps of:
selecting a first state that allows user setting of the setting value and a second state that automatically sets the setting value according to the focus state; and
setting the setting value in a first setting range that is a range of the setting value that can be set by the user in the first state, and sets the setting value in a second setting range that is wider than the first setting range in the second state.

* * * * *